United States Patent
Rendell et al.

(10) Patent No.: US 11,205,316 B2
(45) Date of Patent: Dec. 21, 2021

(54) PRINTING SYSTEM FOR A VENDING MACHINE

(71) Applicant: BEAVER MACHINE CORPORATION, Newmarket (CA)

(72) Inventors: Mark Rendell, Newmarket (CA); Detlef Lange, Newmarket (CA); Robert Schwarzli, Newmarket (CA)

(73) Assignee: BEAVER MACHINE CORPORATION, Newmarket (CA)

( * ) Notice: Subject to any disclaimer, the term of this patent is extended or adjusted under 35 U.S.C. 154(b) by 0 days.

(21) Appl. No.: 16/209,017

(22) Filed: Dec. 4, 2018

(65) Prior Publication Data

US 2019/0108708 A1 Apr. 11, 2019

Related U.S. Application Data

(63) Continuation of application No. 15/527,611, filed as application No. PCT/CA2015/000575 on Nov. 18, 2015, now Pat. No. 10,152,841.

(30) Foreign Application Priority Data

Nov. 19, 2014 (CA) ................................ CA 2871876

(51) Int. Cl.
  *B65C 3/00* (2006.01)
  *G07F 9/02* (2006.01)
  *G07F 11/72* (2006.01)
  *H04L 12/16* (2006.01)
  *B41F 17/00* (2006.01)

(52) U.S. Cl.
  CPC ................ *G07F 9/02* (2013.01); *B41F 17/00* (2013.01); *B65C 3/00* (2013.01); *G07F 11/72* (2013.01); *H04L 12/16* (2013.01)

(58) Field of Classification Search
  CPC ... B41F 17/00; B65C 9/02; B65C 3/00; B65C 3/08
  USPC .............................. 358/1.15, 3.32, 1.12, 1.18
  See application file for complete search history.

(56) References Cited

U.S. PATENT DOCUMENTS

| | | | | |
|---|---|---|---|---|
| 5,571,358 A | * | 11/1996 | Napier | ..................... B31D 1/02 156/227 |
| 6,484,901 B1 | * | 11/2002 | Kim | ....................... G07F 17/26 221/7 |
| 2003/0088332 A1 | * | 5/2003 | Rosenblum | ........... G16H 20/13 700/232 |
| 2010/0017296 A1 | * | 1/2010 | Spignesi, Jr. | ........... G07F 9/002 705/14.66 |
| 2012/0004770 A1 | * | 1/2012 | Ooyen | .................... G07F 11/58 700/235 |

\* cited by examiner

*Primary Examiner* — Jamares Q Washington
(74) *Attorney, Agent, or Firm* — Ralph E. Jocke; Walter & Jocke

(57) ABSTRACT

A printing system provides a printer for printing indicia on a container within a vending machine. The printing system may print indicia based on information relevant to a purchase transaction. The vending machine may transmit to a remote server data relating to a purchase transaction entered into the vending machine, the remote server retrieving data relevant to the purchase transaction and/or to the purchaser and transmitting to the vending machine the data relevant to the purchase transaction, such that the printing apparatus prints indicia on the container based on the received data relevant to the purchase transaction.

23 Claims, 14 Drawing Sheets

PRINTING SYSTEM FOR A VENDING MACHINE

FIELD OF THE INVENTION

This invention relates to vending machines. In particular, this invention relates to a printing system for a vending machine.

BACKGROUND OF THE INVENTION

Vending machines are a very popular method of selling merchandise. Bulk venders, for example, in which a metered amount of product stored in bulk in a bin is dispensed upon payment of a required amount of money, can be used for the self-service purchase of myriad types of products. Such vending machines provide a cost-effective means of selling bulk product, in part because they can be located in unsupervised locations and therefore involve very low overhead.

One of the consequences of locating a vending machine in an unsupervised location is that there is no salesperson to attract purchasers or interest prospective customers in the products being vended. The vending machine itself must have a sufficiently interesting and appealing presence to attract purchasers and interest purchasers in the product. Bulk vending machines are nevertheless a popular means of selling small merchandise such as toys and confectionary, part of their popularity being in the entertainment value associated with the action of a purchaser and the visible reaction of the machine in the dispensing of bulk product. Children in particular are attracted by the visual appeal of bulk product displayed and the product dispensing process. As such, bulk vending machines virtually universally stock product in transparent bins for the visual appeal, and are often manufactured with very large product bins and/or elaborate dispensing paths made deliberately viewable by the purchaser, to increase visual appeal and entertainment value of the vending machine.

However, in today's electronic world the simple act of rotating a coin mechanism in order to receive a treat is typically not sufficiently stimulating for children and adolescents, who are the primary target purchasers from such vending machines. Vending machines are accordingly evolving from simple mechanical devices which dispense treats, toys and other small articles responsive to receiving coins, tokens or the like, to large kiosk-style machines which offer a variety of types of merchandise. An example of such a vending kiosk is described and illustrated in PCT Publication No. WO2013/044364 to the present applicant, which is incorporated herein by reference in its entirety.

Also, consumers in modern society are very health conscious, and when buying food products they need a high degree of confidence that they know the nutritional content of specific foodstuffs being purchased, and particularly the presence of any potential allergens or ingredients to which the purchaser may have a sensitivity. In some regions of the world regulations may require that the nutritional content and/or identification of ingredients of foodstuffs be provided to purchasers on food packages so that the information remains available after purchase of the product.

Furthermore, there is a need for versatility in the end product that can be vended from such vending machines, whereby a consumer has the opportunity to obtain more than merely the products that are physically contained within the vending machine. For example, many of today's products can be customized, or accompanied by selected additional features and/or offers based on demographic information from the consumer when in an interactive sales environment. This is not possible in a conventional vending machine, which is programmed to dispense only products physically contained within the vending machine and only in response to purchase requests entered by the purchaser.

BRIEF DESCRIPTION OF THE DRAWINGS

In drawings which illustrate by way of example only a preferred embodiment of the invention.

DETAILED DESCRIPTION OF THE INVENTION

The present invention provides a printing system for a vending machine dispensing bulk product into a single container. In the preferred embodiment the container is a flexible plastic bag. Thus, according to the invention the user receives a hermetically sealed container filled with the bulk product selection and sealed to prevent contamination. In accordance with the invention, product identifying information, nutritional information and/or other information or indicia may be printed onto the container.

The printing system of the invention is most advantageously implemented in a vending machine such as that described and illustrated in PCT Publication No. WO2013/044364, which is incorporated herein by reference, wherein a variety of products are available for purchase by the purchaser. However, the principles of the invention can be applied to any vending machine, including single stand-alone vending machines, vending machine islands and clusters, vending machine kiosks and others, and the invention is not limited to any particular type of vending machine.

Figure 1:
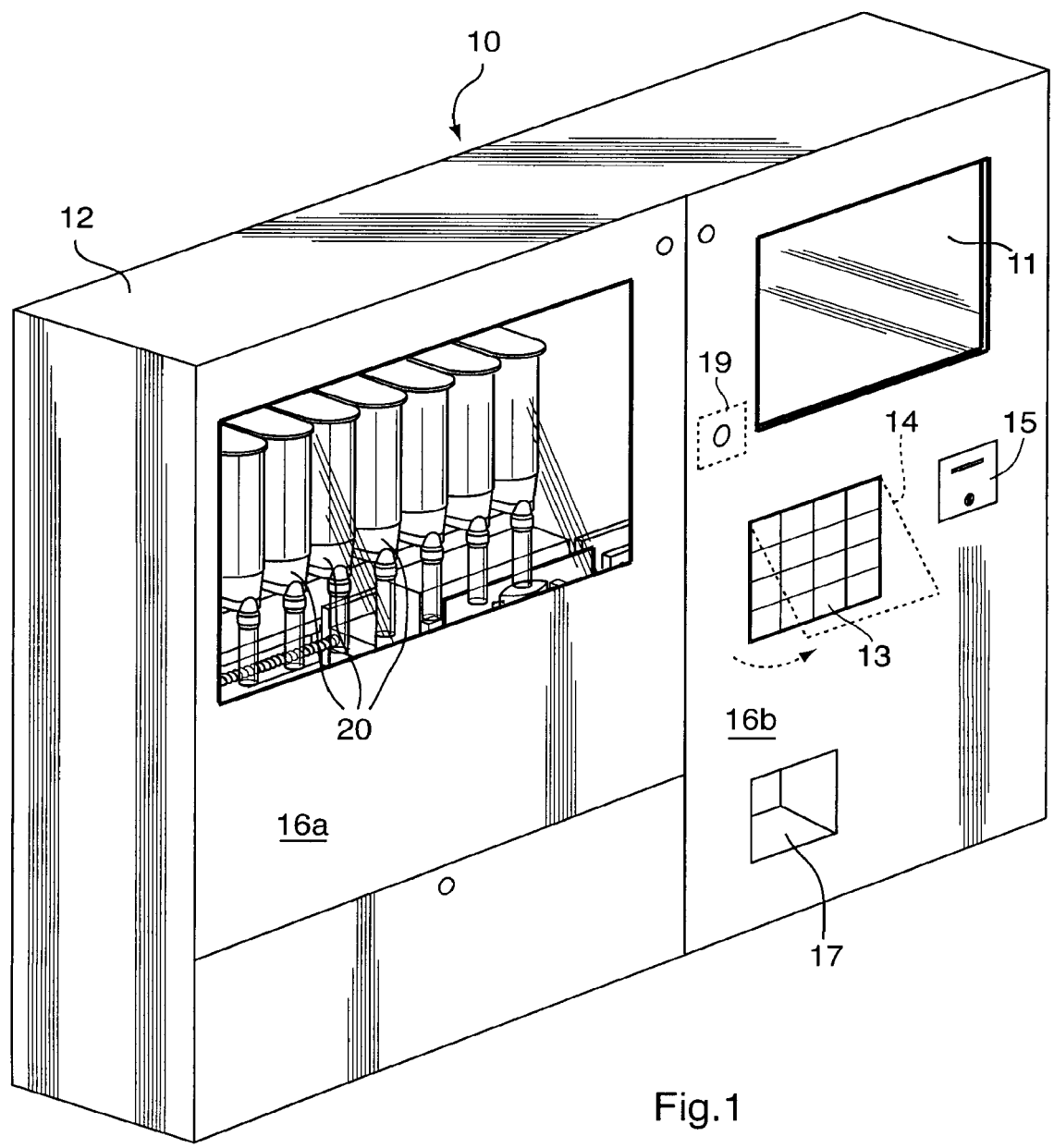
FIG. 1 is a front perspective view of a vending machine according to the invention.
Figure 2:
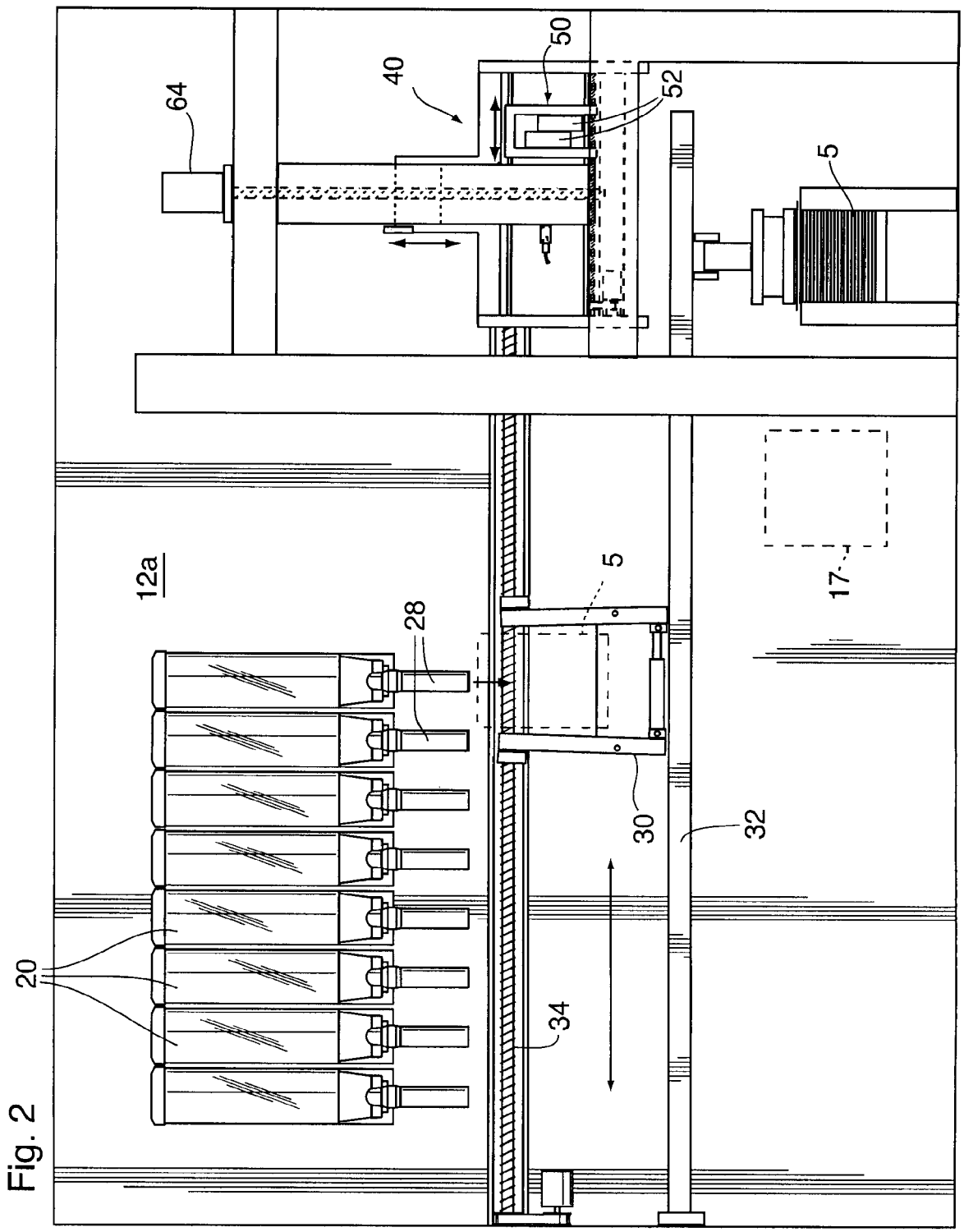
FIG. 2 is a front elevation of the internal components in an embodiment of the vending machine of FIG. 1.

FIGS. 1 and 2 illustrate, solely by way of example, a multiple-module vending machine 10 according to the invention. In the embodiment illustrated the vending machine 10 comprises a secure housing 12 provided with at least one door 16a allowing access to the interior of the housing 12, having a transparent glass or plastic window 14 positioned so that a purchaser can observe the dispensing operation. A second door 16b may be provided to facilitate servicing of the vending machine 10. In other embodiments (not shown) all housing panels may be hinged so that they can be opened to service the different parts of the vending machine 10.

A plurality of vender modules 20, for example bulk vender modules, are securely contained within the housing 12 to allow for the stocking and vending of different types of product from the vending machine 10. The vender modules 20 may be disposed in generally horizontal alignment, as illustrated in FIGS. 1 and 2, and visible through the window 14 to attract prospective purchasers.

In the embodiment illustrated in FIGS. 1 and 2, a bagging system is provided whereby after a purchaser selects one or more of the plurality of bulk vender modules 20 in the vending machine 10, a bag 5 is loaded, opened and successively conveyed beneath each selected bulk vender 20 to receive metered amounts of the bulk product selected by the purchaser through dispensing outlets 28. The bulk product may be multiple products of the user's choosing from a multiple-module vending machine 10 such as that illustrated, in which a plurality of different products such as confectionaries, toys and the like are respectively stored in each of the vender modules 20. Alternatively the bulk product may be the only product available from the vending machine, for example in the case of a single stand-alone vender (not shown). In a multiple-vender vending machine 10 such as that shown in FIG. 1, the printing system of the invention is particularly advantageous because of the ability to customize printed indicia to the specific product selected by the purchaser. However, other customized printing aspects of the invention render the invention beneficial in any vending machine, as described below.

In the preferred embodiment a user interface comprises a mechanical keypad or touch-sensitive keypad 13 (for example a touchscreen) with an optional protective cover 14, shown in phantom in FIG. 1, and a video monitor 11 operated by a processor with suitable drivers and/or other software (not shown) which is well known to those skilled in the art. In the preferred embodiment the video monitor 11 displays purchase options prompting the user to make one or more selections, and transmits command signals to the processor based on the purchaser's input selection indicating the specific type of product desired to be purchased and the amount of product desired to be purchased from each vender module 20. A camera 19 may optionally be mounted for capturing images of the purchaser, for reasons described below. The kiosk may also provide the capability of connection (for example wireless using BlueTooth, wifi etc.) with a mobile for purposes of the purchaser entering information, including pre-prepared information with photos or other graphic matter, text or other etc., into the kiosk. The mobile device can also be used to make payment, via a similar connection to the kiosk.

Figure 11:
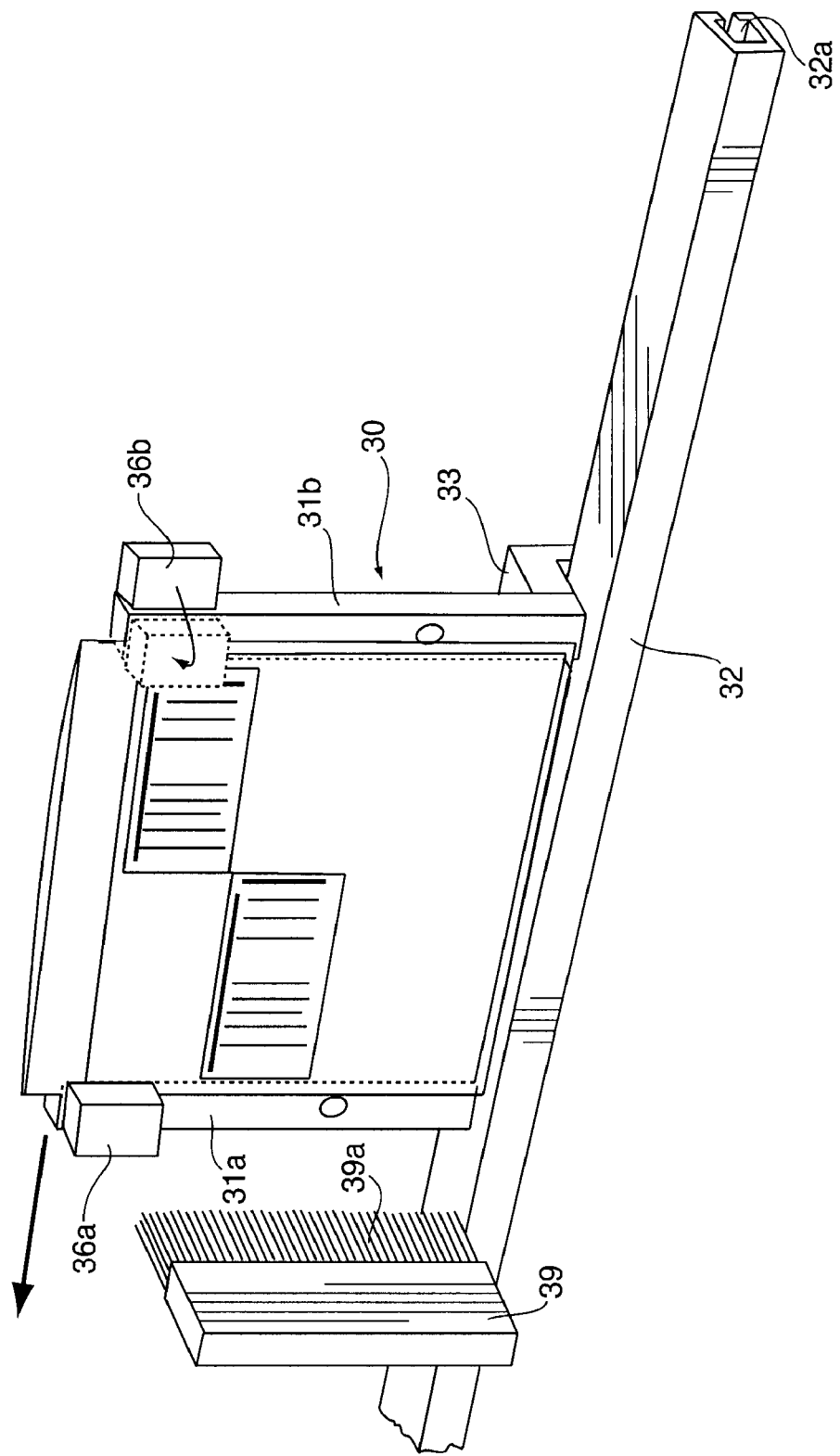
FIG. 11 is a perspective view of the bag retaining platen moving toward a flattening wiper for smoothing out the printing surface.

As shown in FIG. 2, and as described in detail in PCT Publication No. WO2013/044364, a shuttle 30 mounted on rollers on a track or rail 32 is driven by a spindle 34 so as to be movable from a rest position, generally at the bag pickup point shown at the right, to a position beneath any of the selected vender modules 20 for dispensing bulk product from the vender modules 20. In the embodiment illustrated the shuttle 30, best seen in FIG. 11, comprises a base 33 trapped in the rail 32 that is formed with a channel 32a into which a complementary projecting portion (not shown) of the base 33 is trapped in sliding engagement with the rail 32. The base 33 supports leading and trailing shuttle side members 31a, 31b, preferably spaced apart so as to form a frame around the vacuum platen 86, described below, when loading a bag 5 to the shuttle 30. The shuttle side members 31a, 31b may be adapted to pivot in the manner shown and described in PCT Publication No. WO2013/044364 in order to open the bag during the product-dispensing portion of the dispensing cycle.

Figure 3:
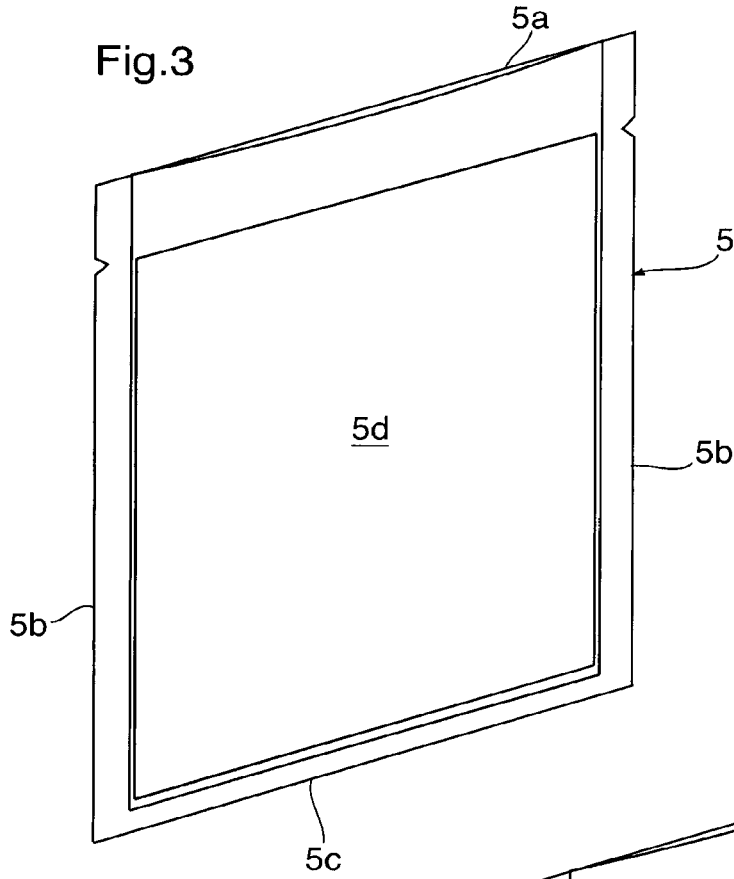
FIG. 3 is a perspective view of a bag suitable for the present invention.
Figure 4:
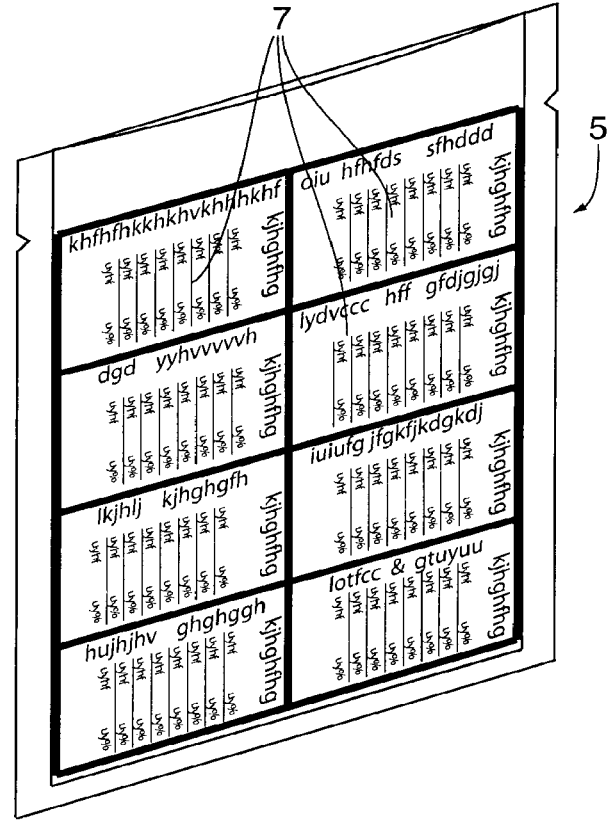
FIG. 4 is a perspective view of the bag of FIG. 3 with indicia printed on one face.

FIGS. 3 and 4 illustrate one preferred container for containing vended product and providing a substrate for printing indicia related to the product, to the purchaser, or to any other indicia for informational or promotional purposes or otherwise. In preferred embodiments the indicia is customized for each specific purchase from the vending machine 10. The container illustrated is a flexible plastic bag 5, having an open top 5a, sealed side edges 5b and a sealed bottom edge 5c. The bags 5 may comprise conventional double-walled cellophane (or other plastic) disposable bags. An outer face of the bag 5 may be provided with a printing panel 5d, for example by treating the bag wall to form a 'frosted' region to which printer ink sticks more readily or adhering a printer-friendly substrate such as a paper label to the bag 5. However, some inks adhere sufficiently for the purposes of the invention to the untreated bag wall that a printing panel 5d is unnecessary. For example many fast-drying inkjet printer inks cure in a very short time (e.g. 5 seconds) and have sufficient adhesion to the untreated plastic to last through the normal usage of the disposable bag 5.

Figure 6A:
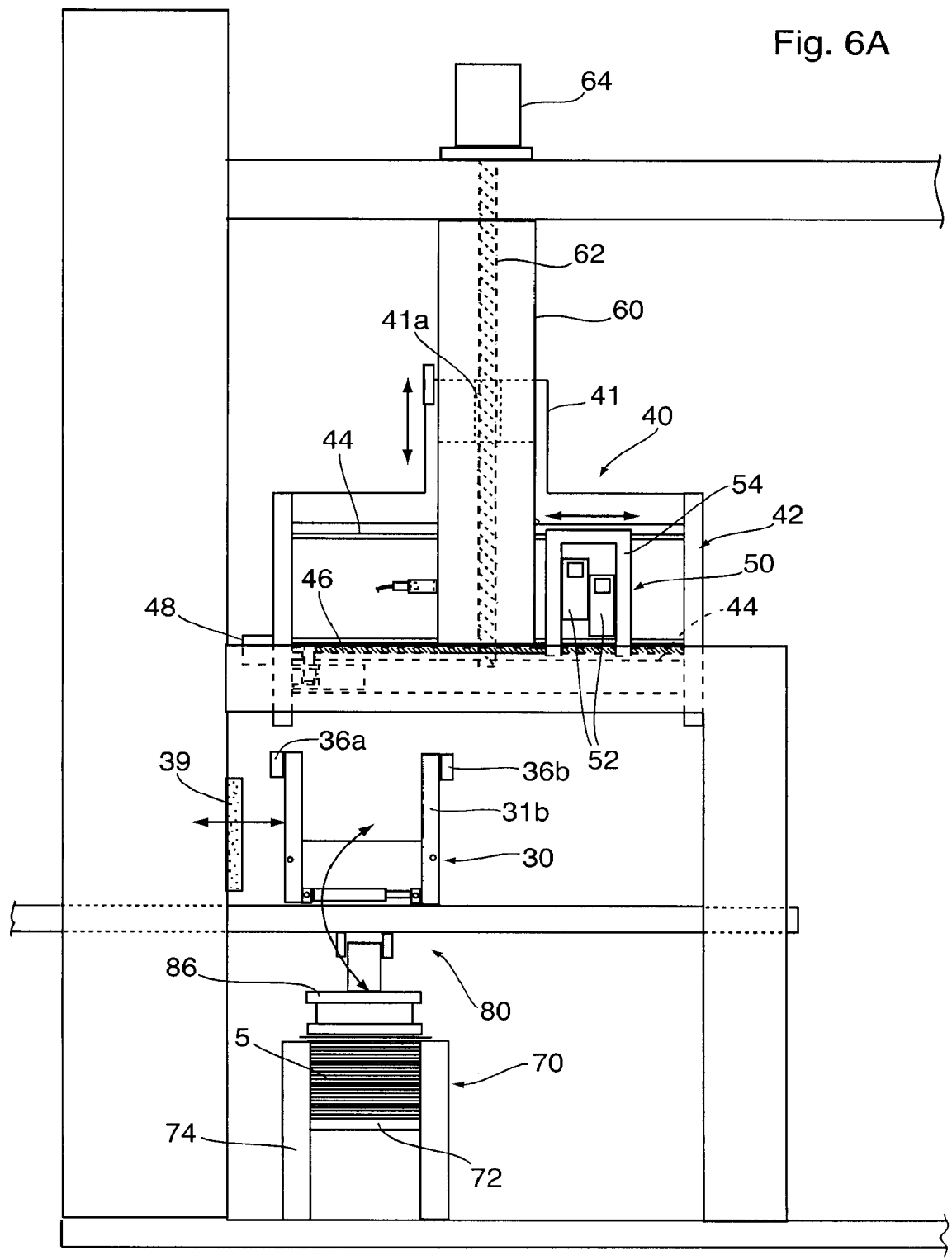
FIGS. 6A and 6B are side elevations of the printer station within the kiosk of FIG. 1 showing the stages of loading a bag to the shuttle.
Figure 6B:
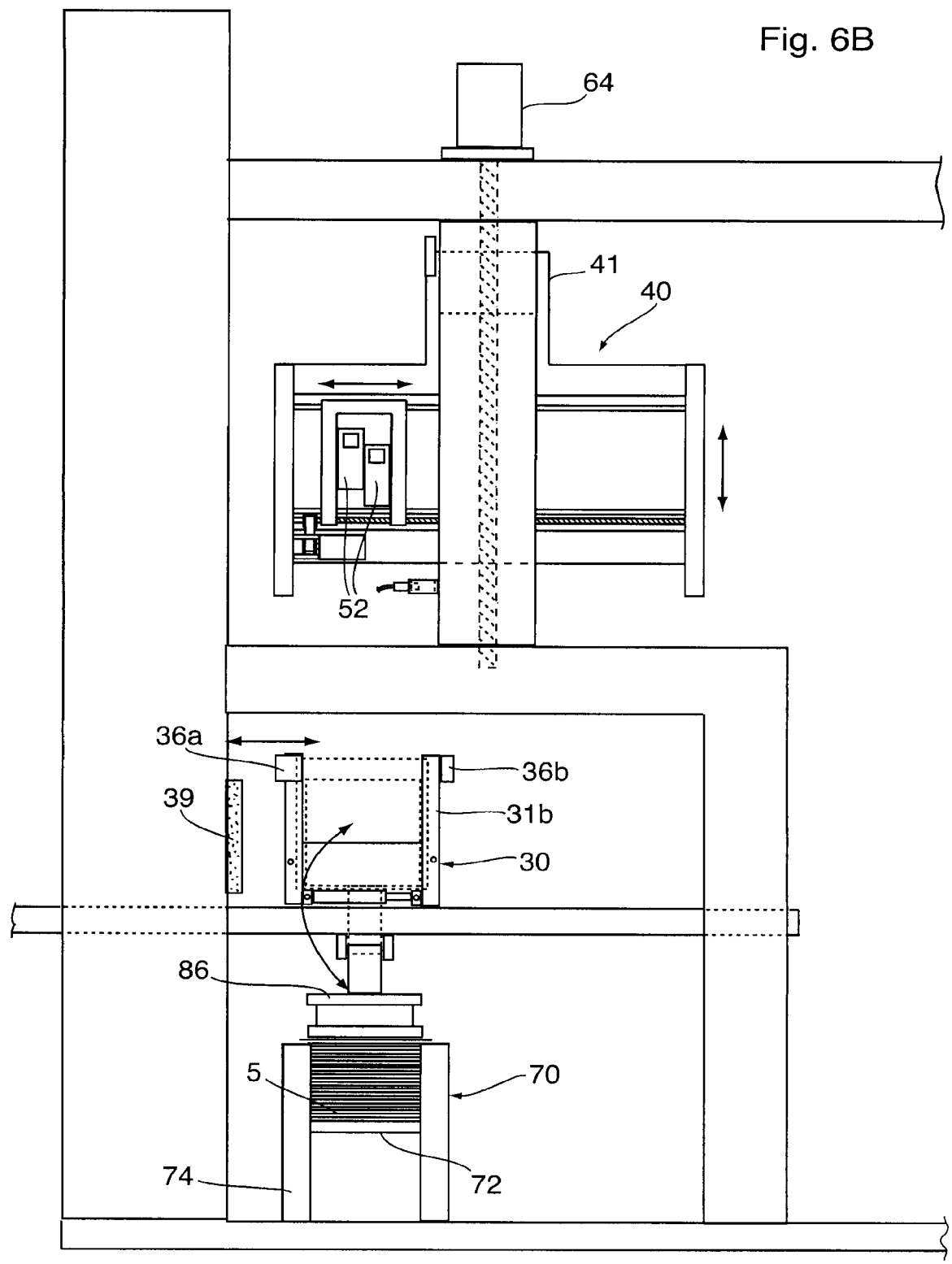
Figure 7A:
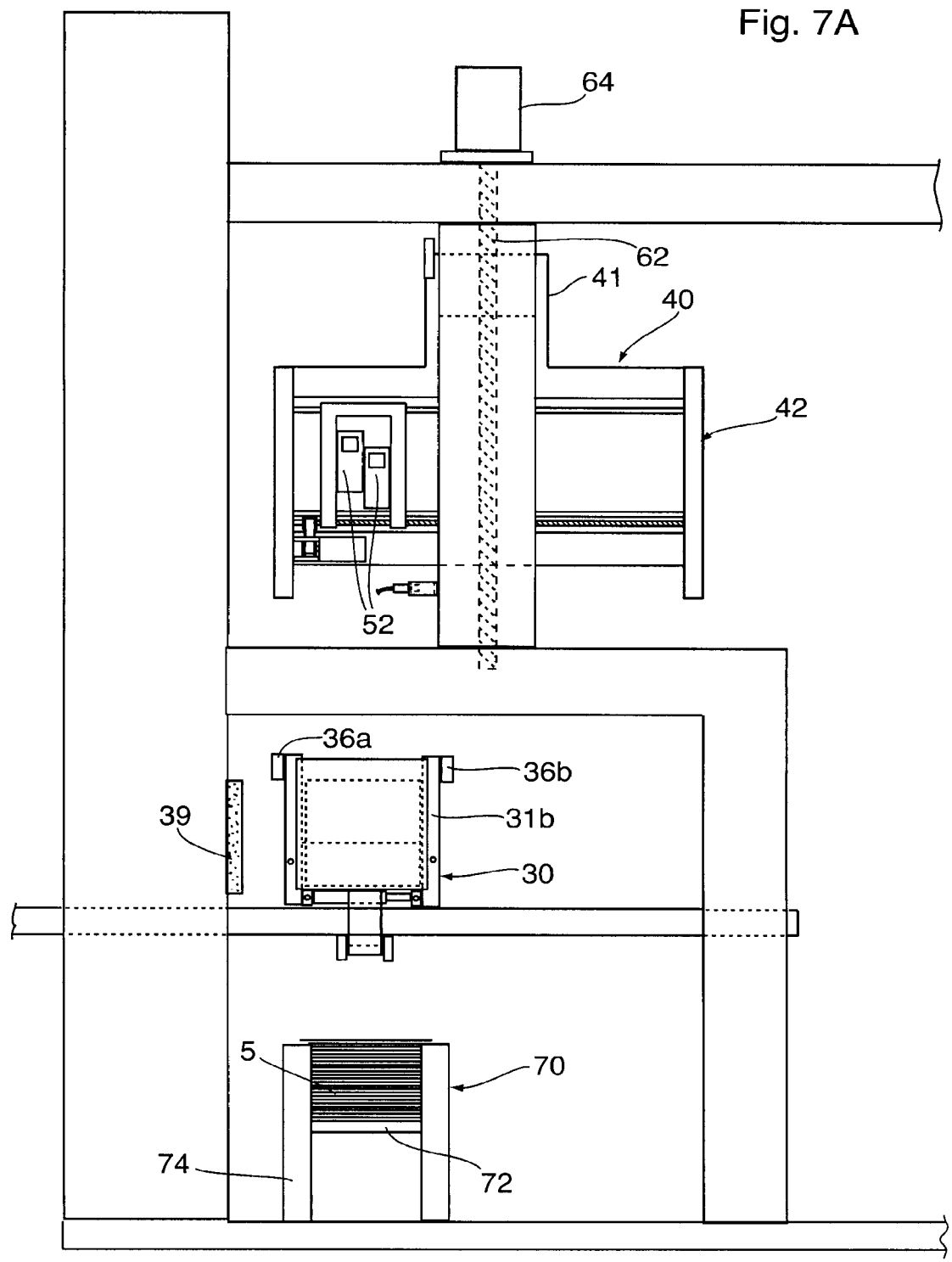
FIGS. 7A, 7B and 7C are side elevations of the printer station showing the stages of printing on the bag.
Figure 7B:
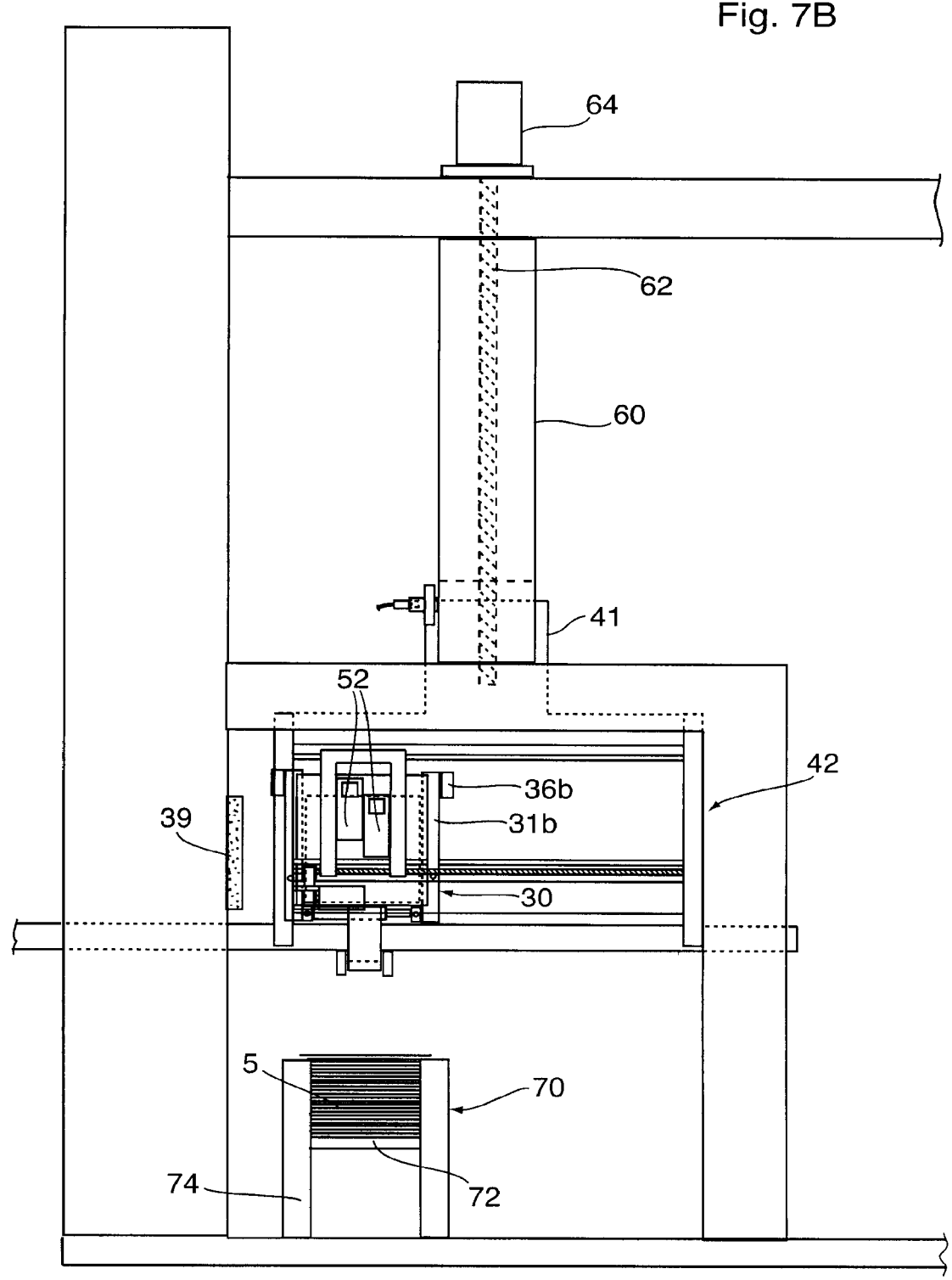
Figure 7C:
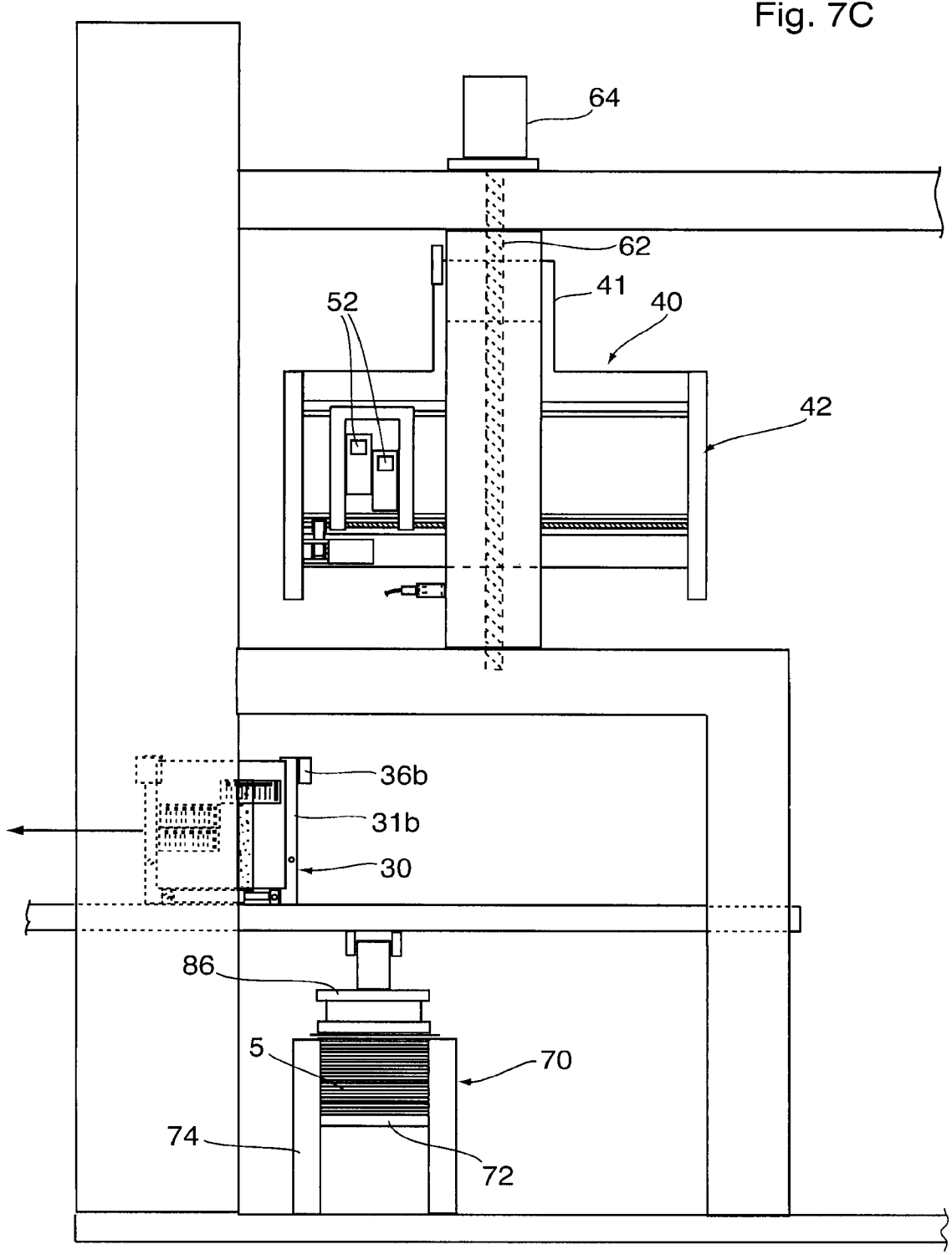
Figure 8:
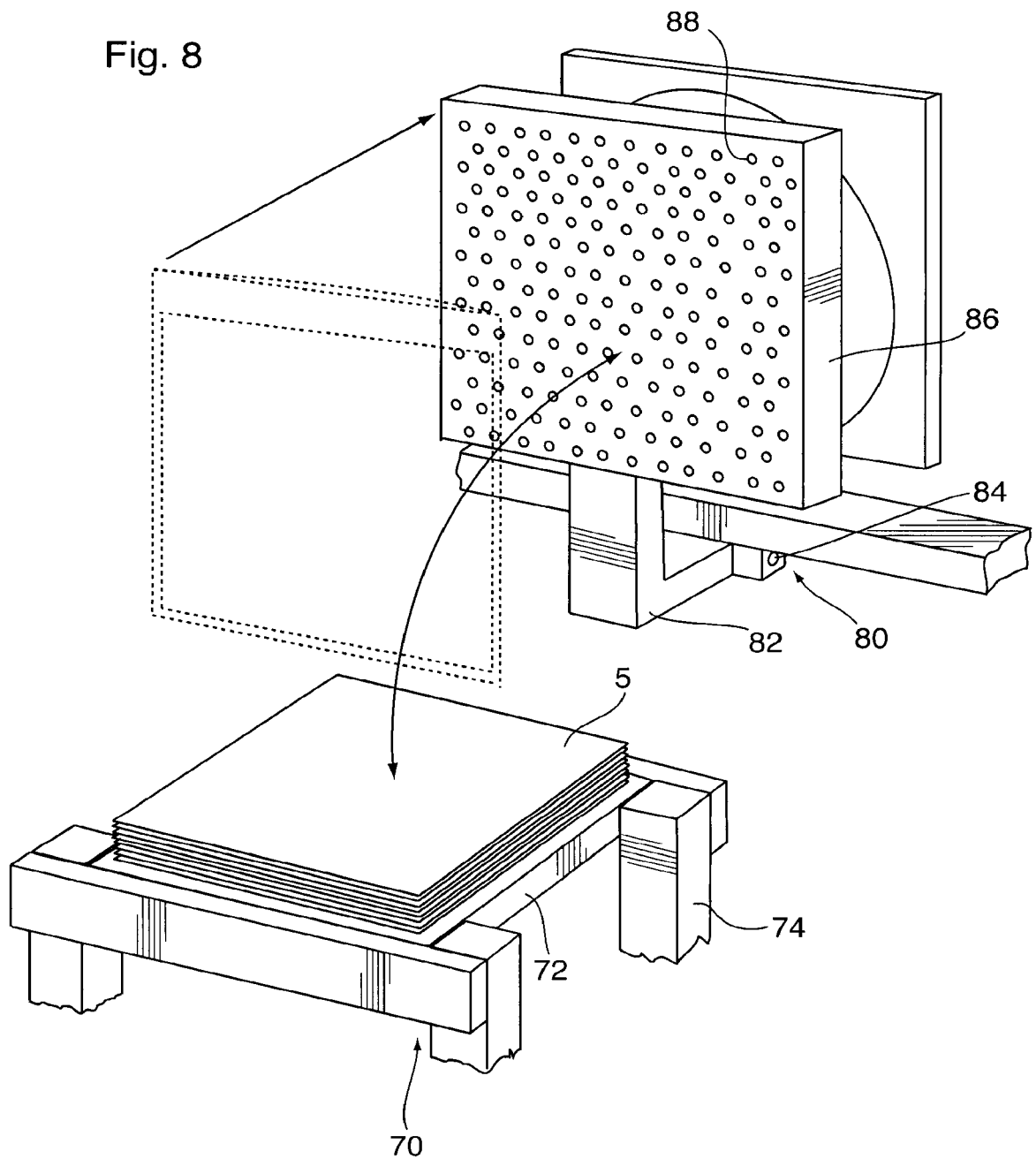
FIG. 8 is a perspective view showing motion of the bag retaining platen.
Figure 9:
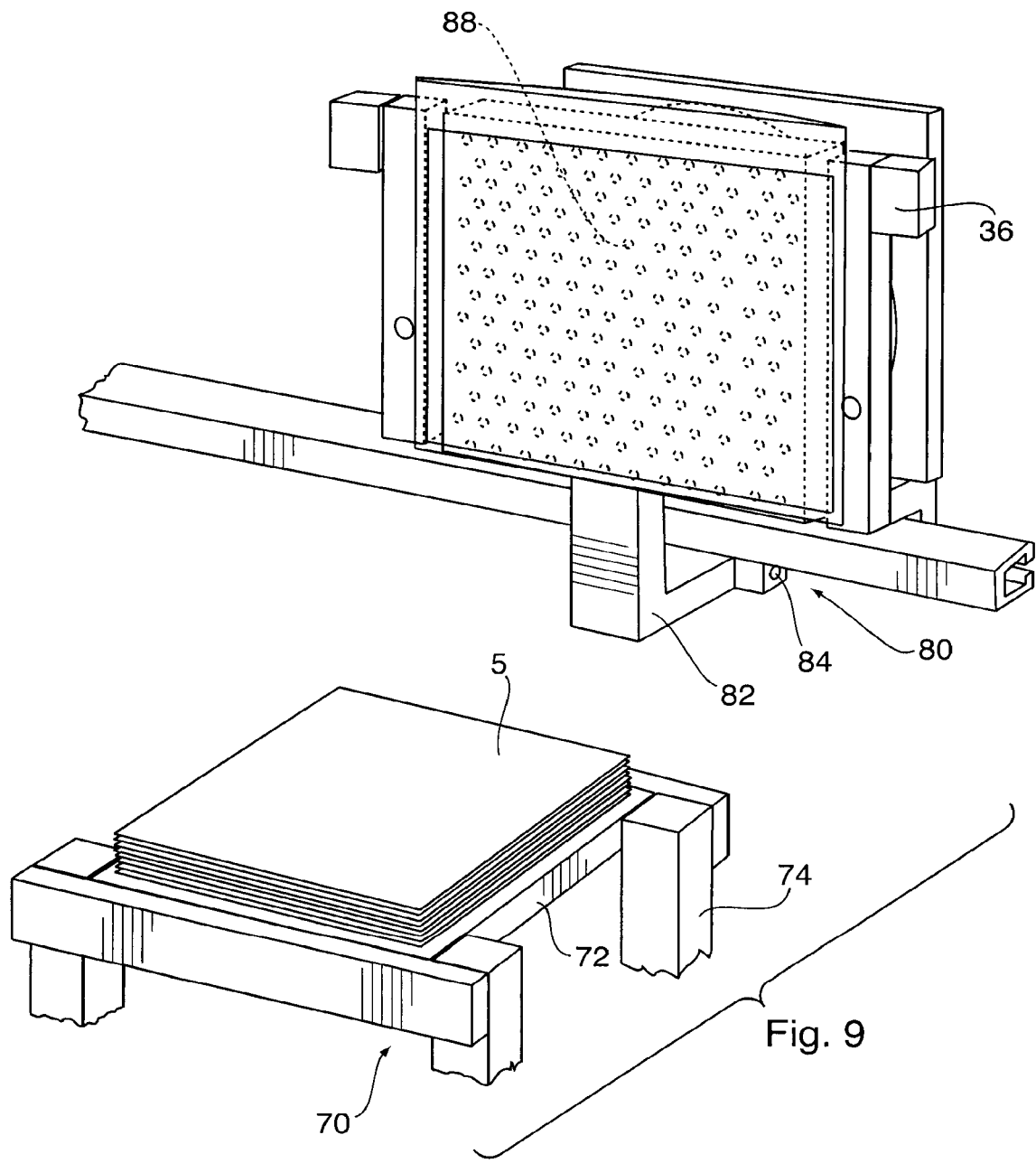
FIG. 9 is a perspective view showing the bag mounted to the bag retaining platen.
Figure 10:
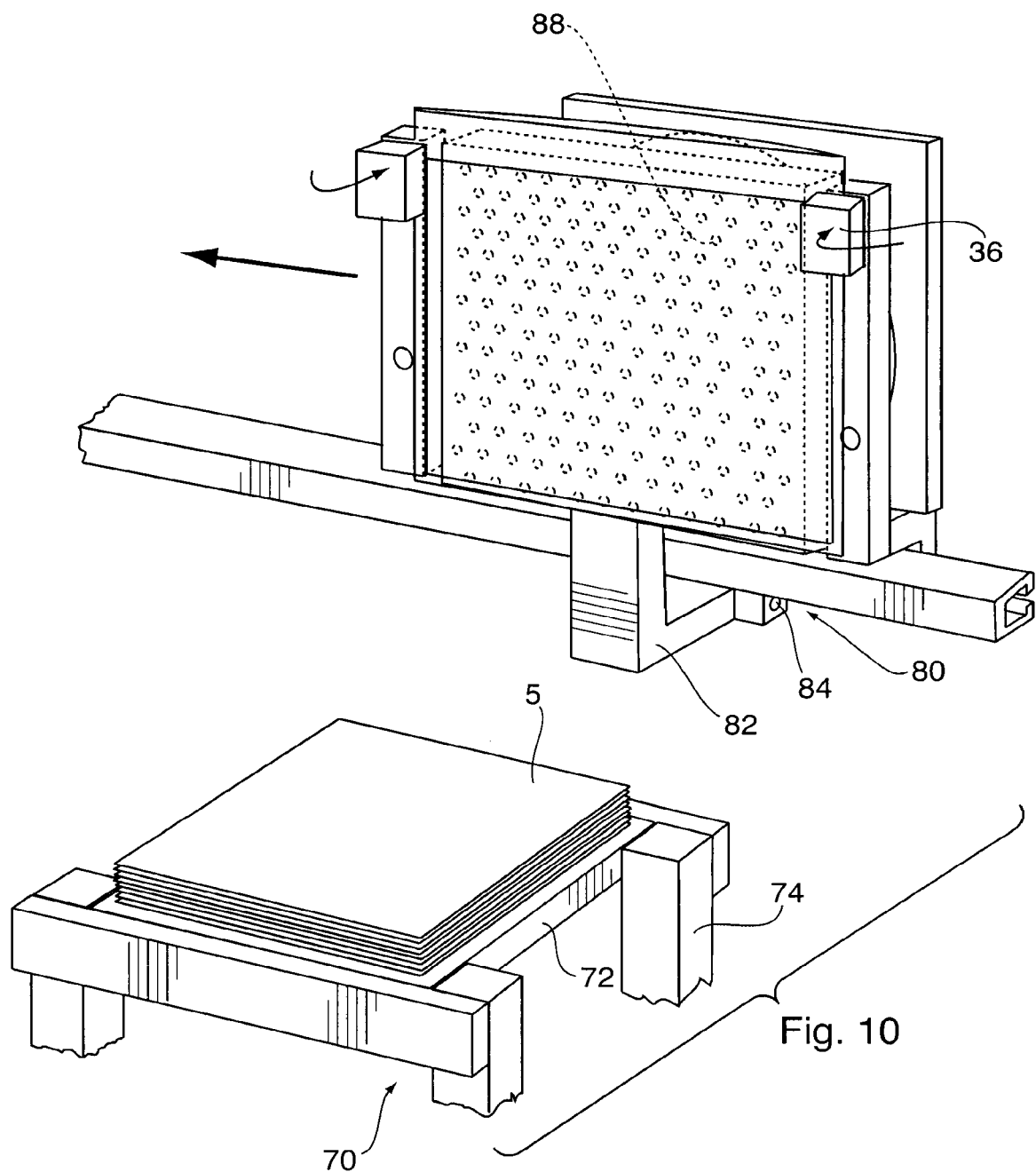
FIG. 10 is a perspective view showing the bag retaining members holding the bag to the bag retaining platen.

An embodiment of a printer 40 for the system of the invention is illustrated in FIGS. 6 and 7. The printer 40 comprises a horizontal carriage 42 comprising upper and lower horizontal tracks 44 onto which is mounted a print head 50 comprising at least one ink dispenser. In the preferred embodiment shown the ink dispenser comprises two conventional inkjet printer cartridges 52 mounted in a print head frame 54. The ink cartridges 52 are preferably staggered vertically so as to increase the printing 'footprint,' and thus the print coverage with each pass along the bag 5, to reduce the duration of the printing cycle.

The print head 50 is slidably affixed to the tracks 44 in the horizontal carriage 42 so as to be movable horizontally, in the embodiment shown driven by a spindle 46 which may for example be driven by a stepper motor 48. The horizontal carriage 42 is in turn slidably affixed to a vertical carriage 60, which may comprise a hollow extrusion, for example by a collar 41 which surrounds the vertical carriage 60 and maintains the horizontal carriage 42 in a precise lateral position relative to the vertical carriage 60. The carriage 42 may be driven along the vertical carriage 60 by a spindle 62 engaging a threaded portion 41a of the collar 41, the spindle 62 in turn being driven by a stepper motor 64. The horizontal carriage 42 and vertical carriage 60 thus essentially form a two-axis positioning gantry system mounted vertically along the plane containing the mounted bag 5, with the print head 50 facing the print panel 5d. In the preferred embodiment the ink cartridges 52 are inset approximately 1 mm from the portion of the print head 50 abutting the bag 5, allowing the required spacing for dispensing ink onto the face of the bag 5.

The print head 50 thus prints a swath P across the face of the bag 5, with each pass from left to right, equal to the cumulative vertical length of the jet panels of the two ink cartridges 52. It will be appreciated that a single print cartridge 52 can be used, but it will take longer to print indicia onto any significant portion of the bag wall. More than two inkjet cartridges can be used to further increase the printing 'footprint,' as desired. Any other ink dispensing system may be used, the advantage of using conventional inkjet cartridges 52 being that they are readily available in many different colours.

The bags 5 are stored at the bag pickup point, which is preferably at the rest or 'home' position of the shuttle 30. In order to print onto the print panel 5d, the bag 5 must be mounted to a generally planar supporting surface. The bags 5 may be stacked onto a plate 72 forming the floor of an open-topped receptacle frame 74, for pickup by a bag loading apparatus 80. The plate 72 may be spring-loaded or otherwise to maintain the top bag 5 in the stack near the top opening of the receptacle frame 74.

FIGS. 8 to 11 illustrate an embodiment of a bag loading apparatus 80 for the system of the invention. In the embodiment illustrated a bag lifting arm 82 is pivotally connected to a bottom portion of the shuttle 30, for example at hinge 84. The arm 82 terminates in a suction device 86, for example a fan or blower having a pickup surface 88 provided with orifices for drawing air into the suction device 86.

The platen 86 thus pivots from the pickup position shown in FIG. 6A to the loaded position on the shuttle 30 as shown in FIG. 7A. Leading and trailing bag retaining members 36a, 36b are pivotally connected to the shuttle side members 31a, 31b, preferably near the top thereof, to assist in retaining the bag 5 mounted to the shuttle 30 throughout the printing and dispensing cycles of the vending machine 10. However, in the preferred embodiment the suction is maintained through at least the printing cycle, to ensure that the bag 5 is stably held in position mounted to the shuttle as the print head 50 rasters across the printing panel 5d.

In operation, the shuttle 30 and printer apparatus 40 start in the rest or 'home' positions illustrated in FIG. 6A, with the shuttle 30 disposed generally above the stack of bags 5 and the bag retaining members 36a, 36b in the fully open position shown in FIG. 6A, and the print head 50 suspended above the top of the shuttle 30. When a purchaser selects the products desired to be purchased (in the multi-vender embodiment illustrated) and inserts the required coin, token, check, credit or debit card, into the payment receiving device (e.g. credit card slot 15, coin slot or the like), or otherwise provides payment, the vending cycle is activated.

The bag loading apparatus 80 is in the home position with the arm 82 lowered and the pickup platen 88 of the suction device 86 (e.g. a fan or blower) resting on the top bag 5 in the stack. The suction device 86 is activated to create a suction through the platen 88, holding the bag 5 to the face of the platen 88, and the arm 82 is raised to the vertical position with the suction device 86 positioned between shuttle side members 31b. The suction remains on during the printing process. In the preferred embodiment a wiper 39 is mounted just downstream of the home position of the shuttle 30, as shown in FIG. 6A, providing flexible wiping members, for example bristles 39a as shown. The shuttle 30 preferably travels past the wiper 39 and then back to the home position in order to flatten the print panel 5d against the pickup platen 88, for the best printing results.

In the home position the shuttle 30 holds the loaded bag 5 in precisely the required horizontal and vertical position for printing, and the vacuum platen 86 forms a backboard for the print head 50 to prevent the bag 5 from moving transversely (e.g. toward or away from the print head 50) during printing.

After the printing process is complete, the printer apparatus 40 is returned to the home position. The leading bag retaining member 36a is closed, and the suction is shut off. The arm 82 is lowered while the trailing bag retaining member 36b remains open, the platen 86 pushing the bag 5 forwardly as it passes the shuttle side members 31b. The shuttle 30 then travels toward the wiper 39, and as it passes the wiper 39 the wiper bristles 39a flatten the bag 5 and push the bag 5 tight toward the trailing side member 31b, removing the 'sag' from the bag. The trailing bag retaining member 36b is then closed, maintaining a tight grip on the bag 5 for dispensing of product.

Printing onto the bag 5 can serve one or more of a number of functions. In a multi-vender vending machine 10 such as that illustrated, the purchaser may purchase a number of different products that are dispensed in metered amounts into the same container (bag 5). Each product has its own list of ingredients. The printing system of the invention permits the ingredients (and/or other information) relating only to the products actually purchased to be listed on the bag 5, for example as shown in FIG. 4. In some embodiments this can be effected by loading an on-board memory in the vending machine 10 with pre-set data for each product being vended, and the print job for any specific purchase thus calls up only the data relating to the selections entered by the user and prints them on the bag 5.

However, in the preferred embodiment the printing apparatus 40 is controlled by a print driver accepting data from a remote location, for example a central server located at the head office of the vending machine operator. The server may for example communicate with the printing system by Internet Protocol, through either a wired or a wireless (for example cellular telephone system, SMS service or any other suitable wireless connection), whereby the print job for the purchase is spooled from the remote server and loaded into on-board buffer. This has the advantage of providing one central location where data can be stored and processed for a plurality of vending machines 10. Thus, if the ingredients change for a particular product being vended, for example, the operator can spool updated data to a plurality of vending machines 10 distributed widely about a geographic region, to overwrite the obsolete nutritional data.

Figure 12:
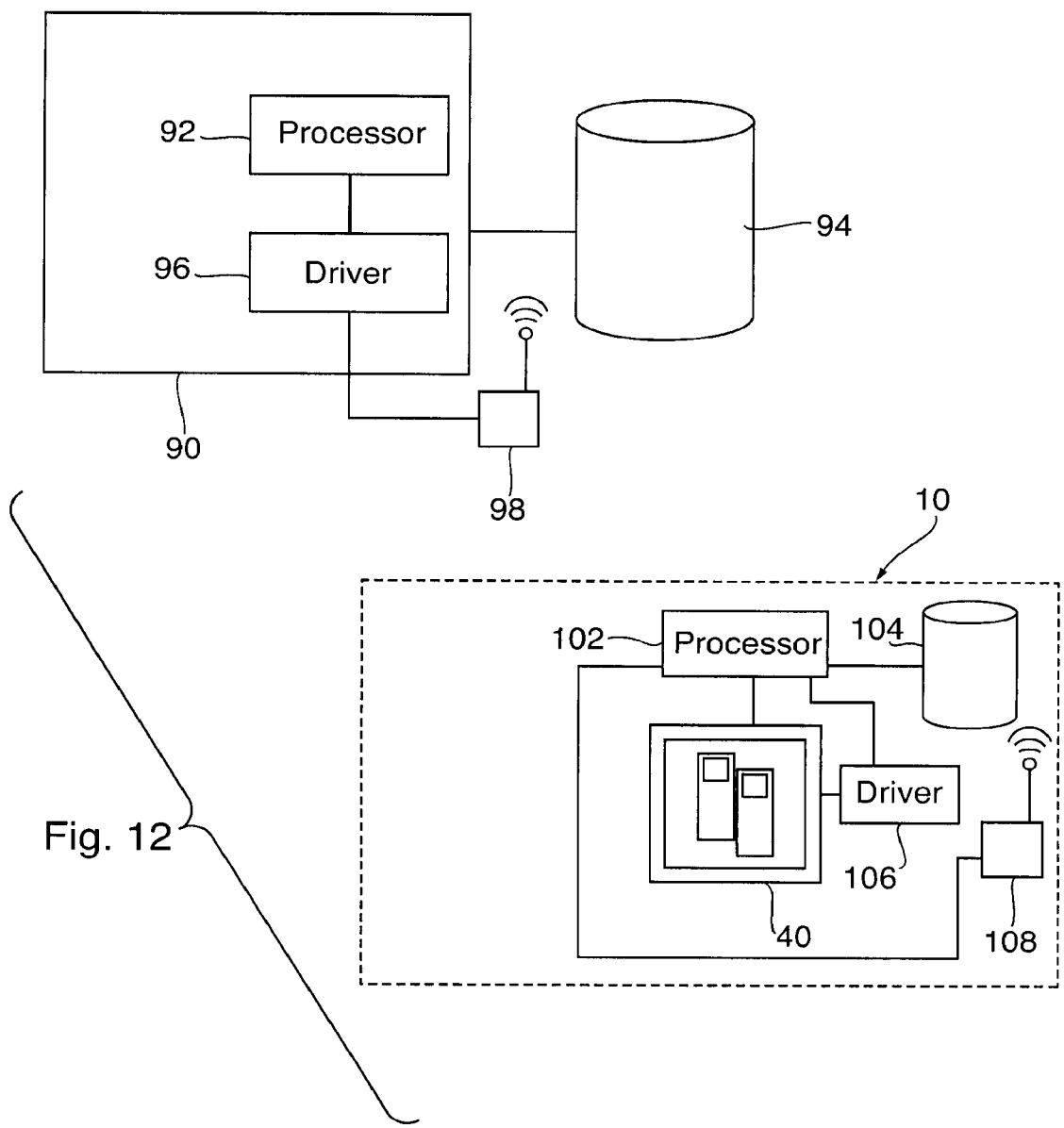
FIG. 12 is a schematic diagram of a remote communication system for enabling and controlling the printing system of the invention.

This also allows the vending machine 10 to print customized indicia on the bag 5. For example, the system of the invention allows the head office to print nutritional information, identifying indicia (manufacturer's name and logo), promotional indicia optionally including reference to specific discount promotions (for example by bar codes, Q codes and other 'coupon'-related indicia), and any other information. In a retail mall environment for example the operator can print coupons on the bag 5 that the purchaser can redeem in one or more stores in the mall, such for a free gift, a discount on shopping or on one or more specific products, or for general promotional purposes. The printing apparatus can print a picture on the bag 5, for example a photograph taken of the purchaser during the product selection process by camera 19, and any other indicia relevant to the purchaser, the purchase, or to for example a significant event such as a birthday or holiday which can be customized as a gift for a third party. The printing system of the invention thus offers the operator of the vending machine 10 the opportunity to create fully customized gift bags, in real time and on site, for dispensing to the purchaser with the selected product. The printing may be on colour or black and white For example, as illustrated in FIG. 12, when a vending machine transaction is initiated by a purchaser a server 90 located at the vending machine operator's head office or in any other convenient location receives, in real time via communications module 98 (for example, a modem with a cellular telephone transceiver), a stream of data from the on-board transceiver 108 in the vending machine 10. This data may include information entered by a purchaser into keypad 13, information from a local data store 104 identifying current product selections and the specific vender containing each selection, images of the purchaser and/or such other data as the operator may consider useful. The processor 92 in the server 90 determines what information stored in a head office a data store, for example database 94, is relevant to the purchaser selections and any other received data; reads the relevant data from the database 94, and tasks printer driver 96 to spool a print job to the vending machine 10 via remote communications module 98. On-board communications module 108 receives the transmission and sends the print job to the printing apparatus 40 via on-board processor 102.

Customized packaging may be created, for example for gifts, promotion or other purposes, utilizing data captured by the camera 19 or by the data entry keypad 13, and/or utilizing data stored in the on-board computer or downloaded from the central server the head office. The purchaser thus has the opportunity to create personalized designs and/or text, which is spooled to the printer driver and printed on the bag 5. In some embodiments a USB port may be provided, to accept files from a computer or mobile device containing graphics and/or other media from a purchaser to be printed on the bag 5.

A local printer driver 106 may optionally be provided to print nutritional information or other indicia stored in the local database 104 without requiring communication from the server 90, for secondary use. The local database 104 can be populated by data from the remote database 108 at desired intervals, avoiding the need for real-time communication during the vending machine transaction. Also, permissions can be given to third party advertising insertion organizations to stream promotional or other indicia to the vending machine for printing on the bag 5, which may be targeted based on an image of the purchaser, data regarding the products purchased by the purchaser, personal information entered by the purchaser or any other demographic indicator. Data from the third party is similarly received by communications module 108 and processed in the same fashion as data from the operator.

Figure 5:
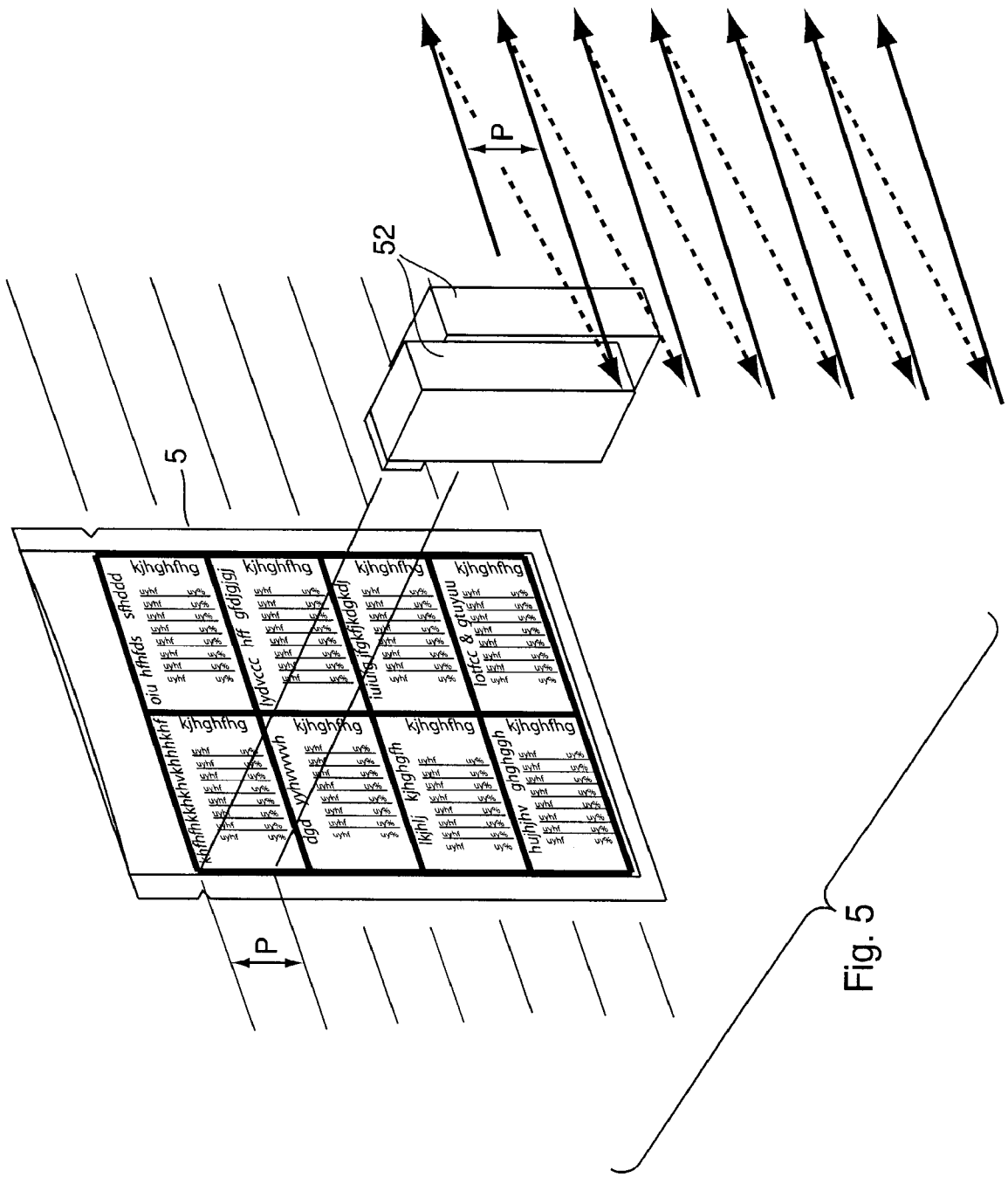
FIG. 5 is a schematic perspective view of the bag of FIG. 3 showing a method of rastering the print head to apply print indicia to the face of the bag.

Once the data has been received by the on-board memory, the print cycle begins. FIG. 5 illustrates by way of example one manner of mastering the print head 50 to print indicia on the bag 5. As the print head 50 reaches the end of the swath P (toward the right hand side of the print panel 5*d*), the ink flow is interrupted and the print head 50 is returned to the left margin of the print panel 5*d*. In some embodiments the print head 50 is moved past the left and right margins of the print panel 5*d*, allowing time for the print head 50 to ramp up to a stable speed and stop, respectively, before ink is dispensed. An encoder (not shown) may be provided for this purpose, to assist in determining when the flow of ink should be started and interrupted during the path of travel of the print head 50.

Actuating the stepper motors 48 and 64 simultaneously at the appropriate relative speeds allows the print head 50 to be moved to the left margin and down to the level of the next swath concurrently, to save time. Increasing the pitch of the spindles 46, 62 also increases the print speed, but this must be balanced against the residence time necessary to deposit sufficient ink on the bag 5 for the indicia to be legible and aesthetically acceptable. It will be appreciated that the print driver can be adapted to print from bottom to top, right to left, boustrophedonically or in any other desired pattern.

Once the printing is complete, the shuttle 30 is moved to the selected vender(s) 20 for dispensing of product, and the bag 5 is subsequently sealed and dispensed to the purchaser, in the manner described in PCT Publication No. WO2013/044364.

The video monitor 11 may also be used to display targeted advertising. The camera 19 captures images in the vicinity of the vending machine 10, including images of a purchaser and other individuals standing within the field of view of the camera 19. These images can be processed by available software loaded into the on-board or a remote server to determine the approximate age and gender of the purchaser, and of other individuals in the vicinity of the vending machine 10. The server can then select one or more stored advertisements and output a video signal to the video monitor 11 which then displays advertising directed to the specific demographic represented by one or more individuals captured by the camera 19, based on the data regarding age, gender and potentially other factors that can be discerned from the individual's appearance (e.g. figure or physique, clothing style etc.). For example, advertising categorized by demographic may be stored in the on-board computer, and/or downloaded from the central server located at the head office of the vending machine operator, and can be changed in real-time as new individuals' images are captured by the camera 19. In some embodiments a separate display (not shown) is mounted elsewhere on the housing 12, for example on the back of the housing 12, with an associated camera capturing a field of view within the viewing area of the display 11. The display(s) 11 can default to an attract mode when no movement is detected around the cameras) 19 on the vending machine 10, and can switch to targeted advertising when an individual's image is detected within the field of view of the camera(s) 19.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method comprising:
   printing indicia onto a container in a vending machine prior to dispensing of the container, the vending machine comprising a printing apparatus and a communications module for receiving transmissions from a remote server, the method including the steps of:
   a) storing remote server data in the remote server or in a data store local to the remote server, the remote server data containing information relating to one or more products stored in the vending machine for dispensing,
   b) transmitting the remote server data from the remote server to the vending machine,
   c) in response to a vending transaction, the vending machine retrieving the remote server data, either from the remote server or from a data store local to the vending machine; and
   d) before the container is tilled with product in the vending machine, the printing apparatus printing the indicia based at least in part on the remote server data, on at least one of the container or on a label to be affixed to the container.

2. The method of claim 1 wherein the remote server data is transmitted to the vending machine in response to the vending transaction.

3. The method of claim 1 wherein the remote server data is combined with vending machine data stored or generated at the vending machine for printing the indicia.

4. The method of claim 3 wherein the vending machine data comprises data stored in a local memory relating to one or more products purchased ley the purchaser.

5. The method of claim 3 wherein data from the vending machine data comprises data provided by the purchaser during a purchase transaction.

6. The method of claim 1 wherein the remote server data comprises data downloaded by third parties to the remote server or to the data store local to the remote server.

7. The method of claim 2 wherein the remote server data comprises nutritional information relating to at least one of the products purchased in the vending transaction.

8. The method of claim 2 wherein the other data comprises promotional information.

9. The method of claim 1 comprising, before step (d), the step of positioning the container at a printer station in the vending machine.

10. The method of claim 9 wherein the container comprises a bag and the printer station comprises a surface against which the bag is positioned for the application of the indicia.

11. The method of claim 1 wherein step (d) comprises the substeps of (i) printing at least the remote server data on the label, and (ii) affixing the label to the container.

12. Apparatus comprising:
a printing system for a vending machine including:
a communications module associated with the vending machine,
a remote server, wherein the server is operative to transmit remote server data to the communications module for printing onto a container, the remote server data comprising information relating to one or more products stored in the vending machine for dispensing,
a data store local to the vending machine, wherein the data store is operative to receive and store the remote server data, and
a printer contained in the vending machine,
wherein the printer is operative to print onto the container or onto a label to be affixed to the container in the vending machine, prior to dispensing of the container from the machine, information or other indicia based at least in part on the remote server data,
a shuttle for positioning the container at a printer station in the vending machine,
wherein the container comprises a bag, and
wherein the printer station comprises a surface against which the bag is positioned for the application of the information relating to
one or more products stored in the vending machine for dispensing, or
other indicia.

13. The system of claim 12 wherein the remote server data comprises data stored in the remote server or in a memory local to the remote server.

14. The system of claim 13 wherein the remote server data comprises data relating to one or more products purchased.

15. The system of claim 14 wherein the data from the remote server comprises nutritional information relating to at least one of the one or more products purchased.

16. The system of claim 12 wherein the data from the remote server comprises promotional information.

17. The system of claim 12 wherein the printer comprises a print head comprising a plurality of ink cartridges operable simultaneously.

18. The system of claim 17 wherein at least two of the plurality of ink cartridges are vertically offset from one another to increase the surface area of the container printed in a single pass.

19. The system of claim 12 wherein the printer prints onto a label affixed to the container.

20. The system of claim 12 wherein the printer prints onto a surface of the container having a texture that promotes adhesion of the ink.

21. A vending machine embodying the printing system of claim 12.

22. A method comprising:
printing indicia onto a container in a vending machine prior to dispensing of the container, the vending machine comprising a printing apparatus and a communications module for receiving transmissions from a remote server, the method including the steps of:
a) storing remote server data in the remote server or in a data store local to the remote server, the remote server data containing information relating to one or more products stored in the vending machine for dispensing;
b) transmitting the remote server data from the remote server to the vending machine;
c) in response to a vending transaction, the vending machine retrieving the remote server data, either from the remote server or from a data store local to the vending machine; and
d) printing simultaneously from a plurality of ink cartridges of the printing apparatus on at least one of the container or on a label to be affixed to the container, indicia corresponding to at least one of transaction data, and other data based at least in part on the remote server data.

23. Apparatus comprising:
a printing system for a vending machine including
a communications module associated with the vending machine,
a remote server, wherein the remote server is operative to transmit remote server data to the communications module for printing onto a container, the remote server data comprising information relating to one or more products stored in and dispensable from the vending machine,
a data store local to the vending machine, wherein the data store is operative to receive and store the remote server data, and
a printer contained in the vending machine,
wherein the printer comprises a print head including a plurality of ink cartridges that are simultaneously operable, and at least two ink cartridges that are vertically offset from one another, whereby surface area printed on in a single pass of the print head is increased,
wherein prior to dispensing of the container from the vending machine, the printer is operative to print onto the container or onto a label to be affixed to the container in the vending machine, information or other indicia based at least in part on the remote server data.

* * * * *

UNITED STATES PATENT AND TRADEMARK OFFICE
CERTIFICATE OF CORRECTION

PATENT NO. : 11,205,316 B2
APPLICATION NO. : 16/209017
DATED : December 21, 2021
INVENTOR(S) : Mark Rendell et al.

Page 1 of 1

It is certified that error appears in the above-identified patent and that said Letters Patent is hereby corrected as shown below:

In the Claims

Column 8, Line 60, "tilled" is changed to "filled.".

Column 9, Line 6, "ley" is changed to "by".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*